(12) United States Patent
Yoneyama

(10) Patent No.: US 9,389,136 B2
(45) Date of Patent: Jul. 12, 2016

(54) CALIBRATION METHOD OF AIR PRESSURE FOR A MOBILE DEVICE, CALIBRATION DEVICE, AND MOBILE DEVICE

(71) Applicant: Huawei Device Co., Ltd., Shenzhen (CN)

(72) Inventor: Atsushi Yoneyama, Tokyo (JP)

(73) Assignee: Huawei Device Co., Ltd., Shenzhen (CN)

( * ) Notice: Subject to any disclaimer, the term of this patent is extended or adjusted under 35 U.S.C. 154(b) by 214 days.

(21) Appl. No.: 14/138,470

(22) Filed: Dec. 23, 2013

(65) Prior Publication Data

US 2014/0102169 A1 Apr. 17, 2014

Related U.S. Application Data

(63) Continuation of application No. PCT/CN2012/076946, filed on Jun. 14, 2012.

(51) Int. Cl.
G01L 27/00 (2006.01)

(52) U.S. Cl.
CPC .............. G01L 27/005 (2013.01); G01L 27/002 (2013.01); *H04M 2250/10* (2013.01); *H04M 2250/12* (2013.01)

(58) Field of Classification Search
CPC ... G01L 27/002; G01L 27/005; G01L 27/007; F02D 41/222; F02D 35/023; G01C 19/56; G01C 25/005; G01C 17/38; G01C 25/00; G01C 21/16
USPC ......................................... 73/1.59, 1.76, 1.77
See application file for complete search history.

(56) References Cited

U.S. PATENT DOCUMENTS

| | | | | |
|---|---|---|---|---|
| 4,531,399 A * | 7/1985 | Aono | ..................... | F02D 35/023 73/1.59 |
| 6,518,918 B1 * | 2/2003 | Vannucci | .................. | G01C 5/06 137/81.1 |
| 6,754,611 B2 * | 6/2004 | Nagashima | ........... | F02D 41/185 123/406.13 |

(Continued)

FOREIGN PATENT DOCUMENTS

| CN | 1324191 A | 11/2001 |
|---|---|---|
| CN | 101536593 A | 9/2009 |

(Continued)

OTHER PUBLICATIONS

Foreign Communication from a Counterpart Application, PCT Application No. PCT/CN2012/076946, International Search Report dated Mar. 21, 2013, 7 pages.

(Continued)

*Primary Examiner* — Eric S McCall
*Assistant Examiner* — Mohammed E Keramet-Amircola
(74) *Attorney, Agent, or Firm* — Conley Rose, P.C.; Grant Rodolph; Adam J. Stegge

(57) ABSTRACT

A calibration method of air pressure for a mobile device, a calibration device and a mobile device, where the calibration method includes acquiring self-location data of the mobile device; acquiring air pressure information from a web site or a web service according to the self-location data; performing calibration of air pressure for the mobile device by using the air pressure information. Through the embodiments of the present invention, dynamic calibration of air pressure is performed; furthermore, another barometer is not needed in the mobile device.

10 Claims, 5 Drawing Sheets

(56) References Cited

U.S. PATENT DOCUMENTS

| | | | |
|---|---|---|---|
| 7,158,905 B2* | 1/2007 | Baird | G01D 3/022 702/104 |
| 2003/0029222 A1* | 2/2003 | Landschoff | F02D 41/222 73/1.58 |
| 2007/0093962 A1 | 4/2007 | Swope et al. | |
| 2008/0184804 A1* | 8/2008 | Leverrier | G01L 9/008 73/702 |
| 2010/0027827 A1 | 2/2010 | Tezuka et al. | |
| 2010/0099433 A1* | 4/2010 | Wigren | G01S 5/021 455/456.1 |
| 2010/0164787 A1 | 7/2010 | Khosravy et al. | |

FOREIGN PATENT DOCUMENTS

| | | |
|---|---|---|
| CN | 102075936 A | 5/2011 |
| EP | 1154231 A1 | 11/2001 |
| JP | 2002039751 A | 2/2002 |
| JP | 2011257260 A | 12/2011 |

OTHER PUBLICATIONS

Foreign Communication from a Counterpart Application, PCT Application No. PCT/CN2012/076946, Written Opinion Report dated Mar. 21, 2013, 4 pages.

"Hypsometric Equation," retrieved from http://en.wikipedia.org/wiki/Hypsometric_equation on Aug. 20, 2014, 3 pages.

"ICAO Standard Atmosphere," Swiss Aviation Resources, retrieved from http://aviation.ch/tools-atmosphere.asp on Aug. 20, 2014, 1 page.

Partial English Translation and Abstract of Japanese Patent Application No. JPA200239751, Dec. 31, 2015, 20 pages.

Partial English Translation and Abstract of Japanese Patent Application No. JPA2011257260, Dec. 31, 2015, 54 pages.

Foreign Communication From a Counterpart Application, Japanese Application No. 2015-516403, Japanese Office Action dated Oct. 27, 2015, 3 pages.

Foreign Communication From a Counterpart Application, Japanese Application No. 2015-516403, English Translation of Japanese Office Action dated Oct. 27, 2015, 4 pages.

Foreign Communication From a Counterpart Application, Chinese Application No. 201280002591.5, Chinese Search Report dated Oct. 18, 2015, 2 pages.

Foreign Communication From a Counterpart Application, Chinese Application No. 201280002591.5, Chinese Office Action dated Nov. 4, 2015, 4 pages.

* cited by examiner

CALIBRATION METHOD OF AIR PRESSURE FOR A MOBILE DEVICE, CALIBRATION DEVICE, AND MOBILE DEVICE

CROSS REFERENCES AND RELATED APPLICATIONS

This application is a continuation of International application No. PCT/CN2012/076946, filed on Jun. 14, 2012, which is incorporated in this application by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This application relates to the sensing technology and in particular, to a calibration method of air pressure for a mobile device, calibration device and mobile device.

BACKGROUND

Recently, air pressure sensors has started to be implemented on mobile device, such as cell phones. The air pressure sensor is used to measure air pressure; and the growing popularity of the sensor may be considered to have increased as the usage rate increases in the mobile industry.

There are some barometers (such as plum bob type barometer, liquid silver type barometer) used as standard reference equipment for the calibration of air pressure.

However, the applicant found that static calibration is used in the existing technology. Those barometers are provided in very limited places only, for example, they are often used in education agency or observatory. Therefore, it is not easy to use those barometers in mobile devices.

Furthermore, in case of the existing method is based on weather observation, a barometer on the clear position for altitude from the ocean surface needs to be set up. Therefore, altitude of the measurement point must be clear, otherwise correct air pressure cannot get measured for the calibration.

Therefore, another barometer is needed separately from the calibration target and the dynamic calibration of air pressure is difficult because the changing of air pressure occurs momentarily in a mobile device.

REFERENCE

[Reference 1] http://www.aviation.ch/tools-atmosphere-.asp

[Reference 2] http://en.wikipedia.org/wiki/Hypsometric_equation

SUMMARY

Embodiments of the present invention pertain to a calibration method of air pressure for a mobile device, calibration device and mobile device. The aim is to perform dynamic calibration of air pressure for a mobile device.

According to a first aspect of the embodiments of the present invention, there is provided a calibration method of air pressure for a mobile device, the calibration method including: acquiring a self-location data of the mobile device; acquiring air pressure information from a web site or a web service according to the self-location data; and performing calibration of air pressure for the mobile device by using the air pressure information.

According to a second aspect of the embodiments of the present invention, there is provided a calibration device of air pressure, applied for a mobile device, the calibration device including: a first acquiring unit configured to acquire a self-location data of the mobile device; a second acquiring unit configured to acquire air pressure information from web site or web service according to the self-location data; and a calibration unit configured to perform calibration of air pressure for the mobile device by using the air pressure information.

According to a third aspect of the embodiments of the present invention, there is provided a mobile device, wherein the mobile device includes the above calibration device.

According to a fourth aspect of the embodiments of the present invention, there is provided a computer-readable program, wherein when the program is executed in a calibration device, the program enables the computer to carry out the calibration method of air pressure.

According to a fifth aspect of the embodiments of the present invention, there is provided a storage medium in which a computer-readable program is stored, wherein the computer-readable program enables the computer to carry out the calibration method of air pressure.

The advantages of the present invention exist in that dynamic calibration of air pressure is performed by using the data from a web site or a web service; furthermore, another barometer is not needed in the mobile device.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWING

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The preferred embodiments of the present invention are described as follows in reference to the drawings.

Embodiment 1

This embodiment of the present invention provides a calibration method of air pressure, applied for a mobile device.

Figure 1:
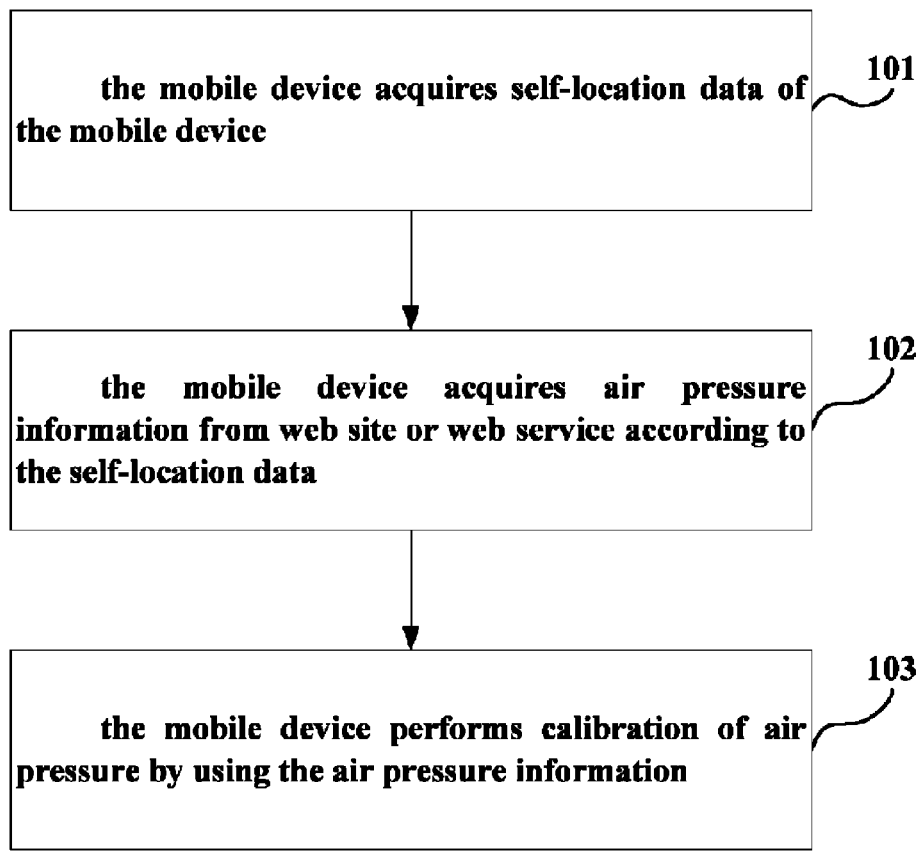
FIG. 1 is a flowchart of the method of an embodiment of the present invention.

FIG. 1 is a flowchart of the method of an embodiment of the present invention. As shown in FIG. 1, the calibration method includes:

Step 101, the mobile device acquires a self-location data of the mobile device;

Step 102, the mobile device acquires air pressure information from a web site or a web service according to the self-location data; and Step 103, the mobile device performs calibration of air pressure by using the air pressure information.

In this embodiment, Global Positioning System (GPS) may be used to acquire the self-location data of the mobile device in step 101. However, it is not limited thereto, and a particular manner may be determined as actually required.

When implementing this embodiment, there are some web sites or web services in a network (such as Internet) and at least the mobile device has the function of connecting to the network. The weather observation data or altitude data from the network are used instead of the barometer as the value for the calibration in this application.

In this embodiment, how to get the web site or web service exists in the prior art and the existing technology may be referred to, which shall not be described any further.

Figure 2:
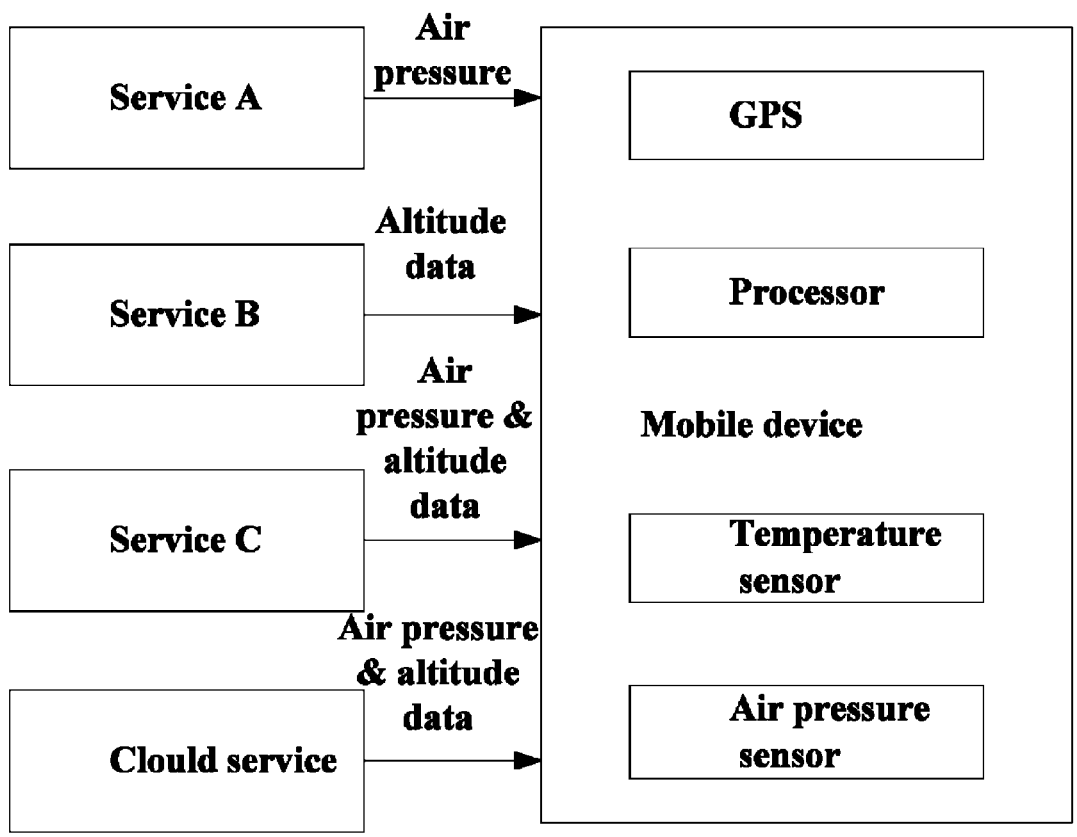
FIG. 2 is a conceptual diagram of an embodiment of the present invention.

FIG. 2 is a conceptual diagram of an embodiment of the present invention. As shown in FIG. 2, the mobile device may have a GPS apparatus, an air pressure sensor, and a processor. The mobile device may further have a temperature sensor.

The GPS apparatus is implemented to the mobile device to get coordinate data (such as the self-location data). The air pressure sensor is the target of dynamic calibration and it is implemented to the mobile device. The temperature sensor is implemented to get temperature data around the mobile device.

As shown in FIG. 2, there may be a web service A, a web service B, a web service C and a cloud service in the network. Wherein, the service A is distributing air pressure data, the service B is distributing altitude data, the service C is distributing air pressure data and altitude data, and the cloud service is collecting and distributing air pressure data and altitude data.

In one scenario, the mobile device acquires air pressure information from a web site or a web service according to the self-location data which may specifically include: acquiring an air pressure value and an altitude value from a web site or a web service according to the self-location data.

When implementing this embodiment, the mobile device may get the air pressure value and the altitude value where nearest from the present location by using the self-location data from the service C or the cloud service directly.

Figure 3:
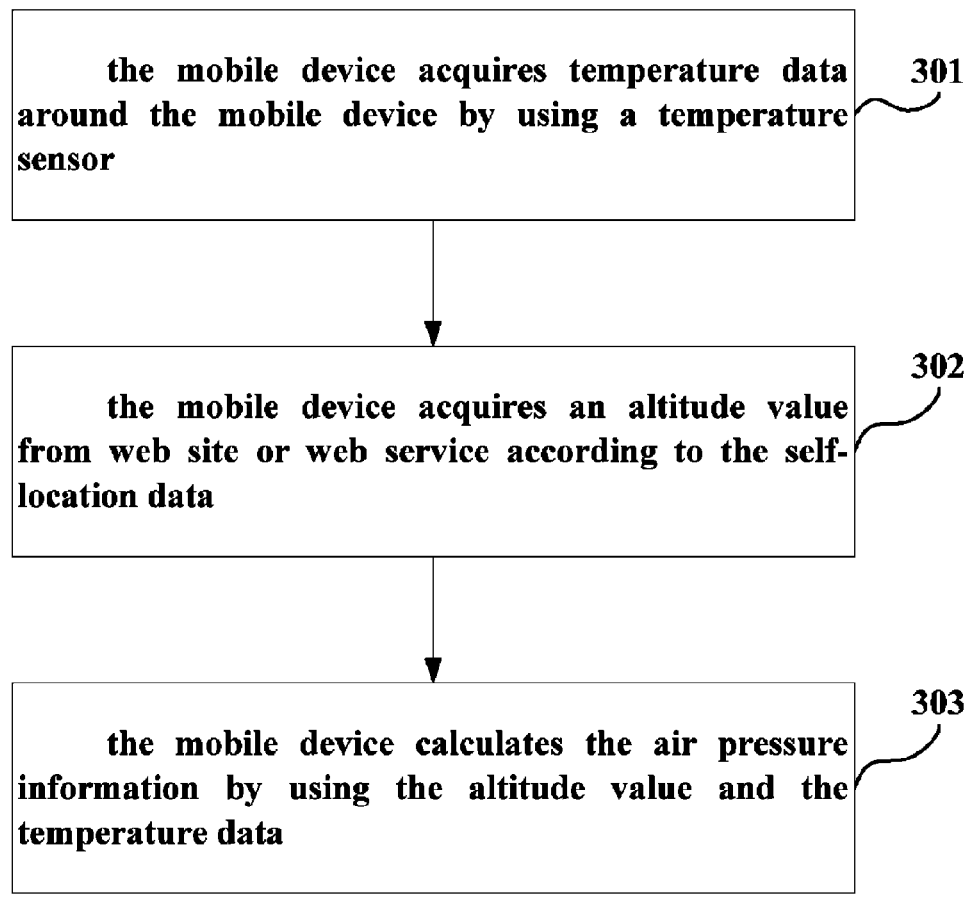
FIG. 3 is a flowchart of acquiring air pressure information from a web site or a web service.

In another scenario, the mobile device may not get the air pressure value from a web site or web service directly. FIG. 3 is a flowchart of acquiring air pressure information from a web site or a web service.

As shown in FIG. 3, the step 102 may specifically include:

Step 301, the mobile device acquires temperature data around the mobile device by using a temperature sensor;

Step 302, the mobile device acquires an altitude value from web site or web service according to the self-location data; and Step 303, the mobile device calculates the air pressure information by using the altitude value and the temperature data.

When implementing this embodiment, the mobile device may get the altitude value where nearest from the present location by using the self-location data from the service C or the service B directly and get the temperature data from the temperature sensor.

When implementing this embodiment, the following formula may be used to calculate the air pressure:

$$P = P_0 \left(1 - \frac{0.0065h}{T_0 + 273.15}\right)^{5.257}$$

$$T_0 = T + 0.0065h$$

P is the air pressure value; $P_0$ is the sea-level pressure (fixed value as 1013.25 hPa); h is the altitude value and T is the temperature value. However, it is not limited thereto, and a particular manner may be determined as actually required.

In another scenario, the mobile device acquires air pressure information from a web site or web service according to the self-location data which may specifically include: acquiring an air pressure value directly from web site or web service according to the self-location data.

When implementing this embodiment, the mobile device may get the air pressure value where nearest from the present location by using the self-location data from the service A directly.

When implementing this embodiment, the mobile device may further get the altitude value where nearest from the present location by using the self-location data from the service B directly and get the temperature data from the temperature sensor. Then, the above formula may be used to calculate the air pressure.

Figure 4:
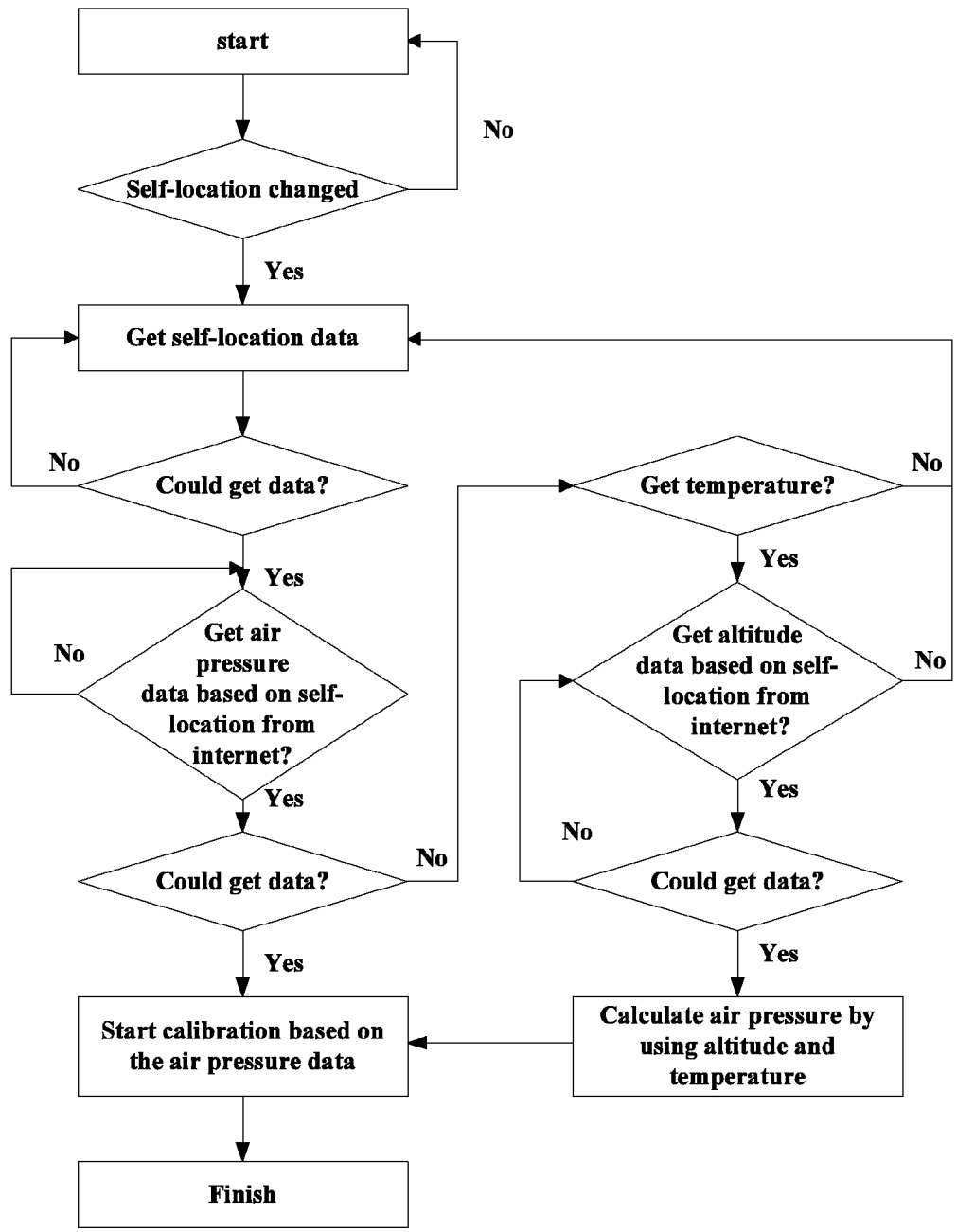
FIG. 4 is a flowchart showing an example of the present invention.

FIG. 4 is a flowchart showing an example of the present invention. As shown in FIG. 4, this solution provides the dynamic calibration method which does not need to use another barometer to calibrate implemented air pressure sensor to the mobile device.

In this embodiment, in case a mobile device has all of the air pressure and altitude data, it will have the same effects of this invention. However, air pressure is changing momentarily. Therefore, the data amount should be huge. This means it is very difficult to store all of the air pressure and altitude data on the mobile device.

It can be seen from the above embodiment that dynamic calibration of air pressure is performed by using the data from a web site or a web service for the calibration of air pressure; furthermore, another barometer is not needed in the mobile device.

Embodiment 2

This embodiment of the present invention further provides a calibration device of air pressure for a mobile device. This embodiment corresponds to the method of the above embodiment 1, applied in the mobile device; and the same content will not be described.

Figure 5:
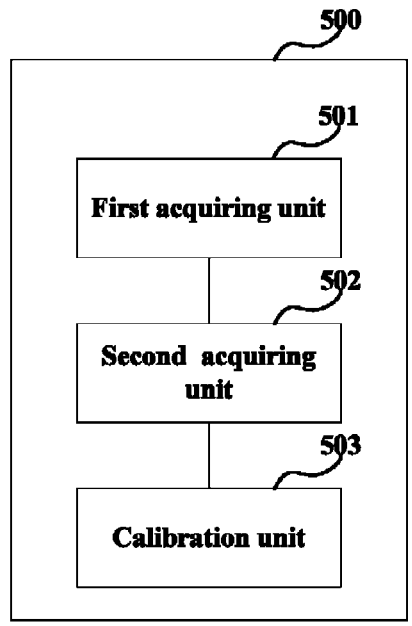
FIG. 5 is a schematic diagram of the calibration device of an embodiment of the present invention.

FIG. 5 is a schematic diagram of the calibration device of an embodiment of the present invention. As shown in FIG. 5, the calibration device 500 includes: a first acquiring unit 501, a second acquiring unit 502 and a calibration unit 503;

Wherein the first acquiring unit 501 is used to acquire a self-location data of the mobile device; the second acquiring unit 502 is used to acquire air pressure information from a web site or a web service according to the self-location data; and the calibration unit 503 is used to perform calibration of air pressure for the mobile device by using the air pressure information.

When implementing this embodiment, the first acquiring unit 501 is a GPS apparatus. However, it is not limited thereto, and a particular manner may be determined as actually required.

In one scenario, the second acquiring unit 502 is specifically used to acquire an air pressure value and an altitude value from a web site or a web service according to the self-location data.

Figure 6:
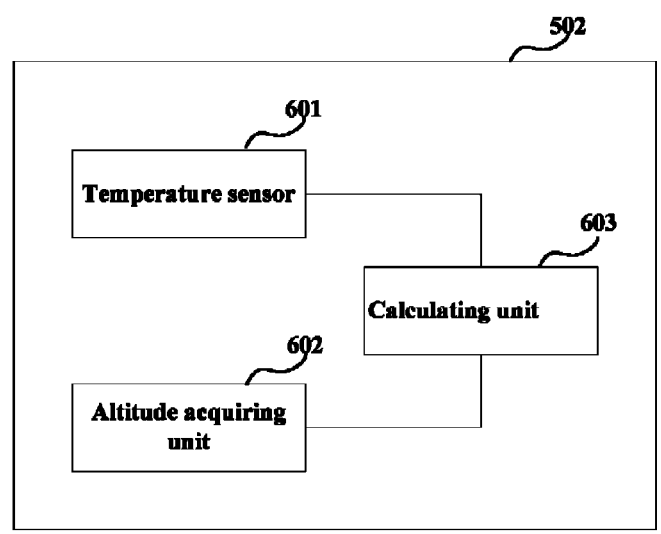
FIG. 6 is a schematic diagram of the second acquiring unit.

In another scenario, the mobile device may not get the air pressure value from a web site or a web service directly. FIG. 6 is a schematic diagram of the second acquiring unit.

As shown in FIG. 6, the second acquiring unit 502 may specifically include: a temperature sensor 601, an altitude acquiring unit 602 and a calculating unit 603;

Wherein the temperature sensor 601 is used to acquire temperature data around the mobile device; the altitude acquiring unit 602 is used to acquire an altitude value from a web site or a web service according to the self-location data; the calculating unit 603 is used to calculate the air pressure information by using the altitude value and the temperature data.

In another scenario, the second acquiring unit 502 is specifically used to acquire an air pressure value directly from a web site or a web service according to the self-location data.

It can be seen from the above embodiment that dynamic calibration of air pressure is performed by using the data from web site or web service for calibration of air pressure; furthermore, another barometer is not needed in the mobile device.

The embodiments of the present invention further provide a mobile device, wherein the mobile device includes the calibration device of the above embodiment.

The embodiments of the present invention further provide a computer-readable program, wherein when the program is executed in a calibration device, the program enables the computer to carry out the calibration method of air pressure.

The embodiments of the present invention further provide a storage medium in which a computer-readable program is stored, wherein the computer-readable program enables the computer to carry out the calibration method of air pressure.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A calibration method of air pressure for a mobile device, the calibration method comprising:
    acquiring a self-location data of the mobile device;
    acquiring a temperature data around the mobile device using a temperature sensor;
    acquiring an altitude value from either a web site or a web service according to the self-location data;
    calculating air pressure information using the altitude value and the temperature data; and
    performing a calibration of air pressure for the mobile device using the air pressure information.

2. The calibration method according to claim 1, wherein a Global Positioning System (GPS) is used to acquire the self-location data of the mobile device.

3. The calibration method according to claim 1, wherein acquiring the altitude value from either the web site or the web service according to the self-location data comprises acquiring the altitude value directly from either the web site or the web service according to the self-location data.

4. The calibration method according to claim 1, further comprising requesting an air pressure value from either the web site or the web service according to the self-location data, wherein the mobile device acquires the altitude value when the air pressure value is not available from either the web site or the web service.

5. A mobile device comprising a calibration device of air pressure, wherein the calibration device comprises:
    a first acquiring position sensor configured to acquire a self-location data of the mobile device;
    a second acquiring position sensor comprising:
        a temperature sensor configured to acquire a temperature data around the mobile device;
        an altitude sensor configured to acquire an altitude value from either a web site or a web service according to the self-location data; and
    a processor configured to:
        calculate air pressure information using the altitude value and the temperature data; and
        perform calibration of air pressure for the mobile device using the air pressure information.

6. The calibration device according to claim 5, wherein the first acquiring position sensor is a Global Positioning System (GPS) apparatus.

7. The calibration device according to claim 5, wherein the second acquiring position sensor is configured to acquire the altitude value directly from either the web site or the web service according to the self-location data.

8. The calibration device according to claim 5, where the second acquiring unit requests an air pressure value from either the web site or the web service according to the self-location data, and wherein the second acquiring unit acquires the altitude value when the air pressure value is not available from either the web site or the web service.

9. A computer program product comprising computer executable instructions stored on a non-transitory computer readable medium such that when executed by a processor cause a mobile device to:
    acquire a self-location data of the mobile device;
    acquire a temperature data around the mobile device using a temperature sensor;
    acquire an altitude value from either a web site or a web service according to the self-location data;
    calculate air pressure information using the altitude value and the temperature data; and
    perform a calibration of air pressure for the mobile device ng the air pressure information.

10. The computer program product according to claim 9, further comprising request an air pressure value from either the web site or the web service according to the self-location data, wherein the computer program product acquires the altitude value when the air pressure value is not available from either the web site or the web service.

* * * * *